May 10, 1927.
J. V. GIESLER
1,628,138
STEAM ENGINE
Filed Feb. 14, 1924
2 Sheets-Sheet 1
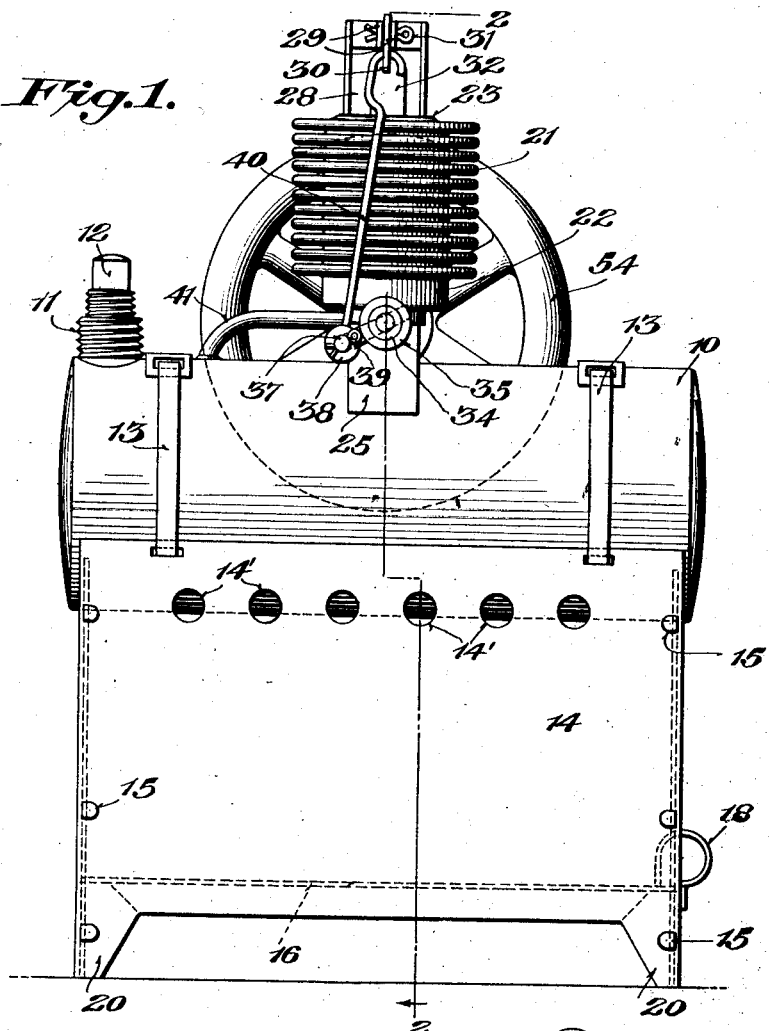
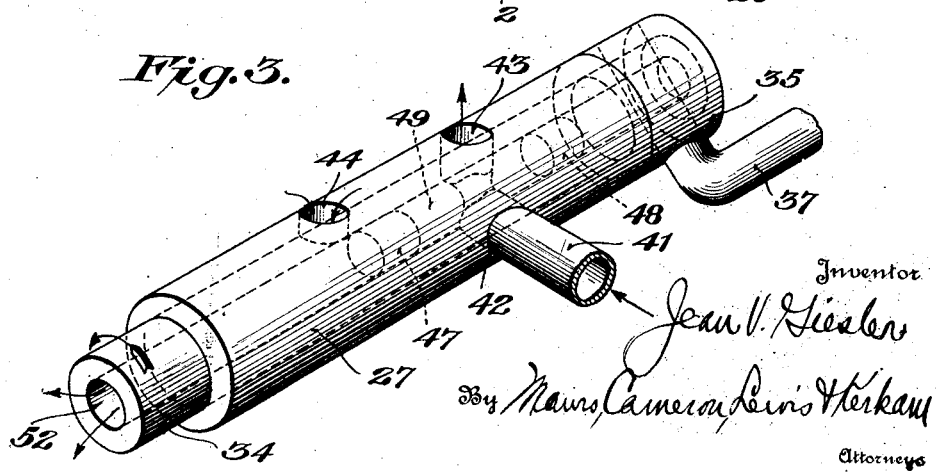

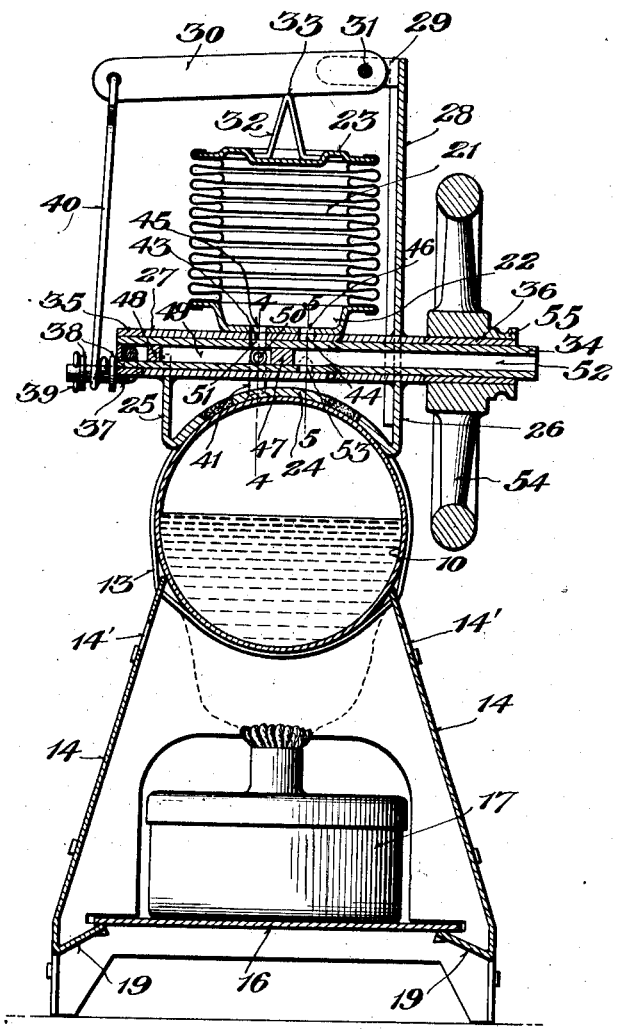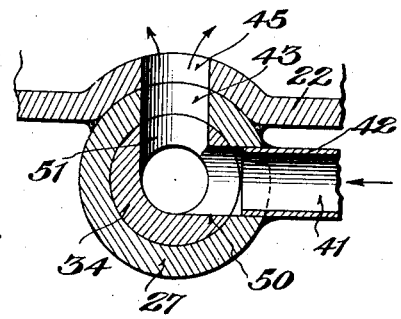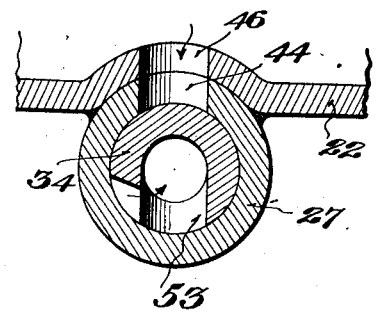

Patented May 10, 1927.

1,628,138

UNITED STATES PATENT OFFICE.

JEAN V. GIESLER, OF KNOXVILLE, TENNESSEE, ASSIGNOR TO THE FULTON COMPANY, OF KNOXVILLE, TENNESSEE, A CORPORATION OF MAINE.

STEAM ENGINE.

Application filed February 14, 1924. Serial No. 692,805.

This invention relates to engines and, while some of the features thereof are capable of other applications, has particular reference to small engines such as are commonly used as toys.

It has heretofore been proposed to provide small engines, using steam, hot air, compressed air, etc., as the motive fluid, with a bellows which is expanded by the motive fluid to produce mechanical movement. Devices of this character heretofore proposed, however, have been subject to numerous objections among the more important of which may be mentioned the complexity of their construction whereby the initial cost of manufacture was so high as to prevent production at prices commensurate with their use as toys; the fragility of their construction whereby they were likely to get out of order quickly under the rough usage to which toys are subjected; and the shortness of their life under the repeated flexure to which the bellows were subjected whereby leaks soon developed and the device became inoperative.

It is an object of this invention to provide an engine which is composed of a minimum number of simple parts which can be inexpensively manufactured and assembled and which is strong and durable, so that the initial cost of manufacture is small, there is little likelihood of the parts being injured or broken by the use to which such a device is put, and the repeated operation of the device is unlikely to develop leaks to render the device inoperative.

The invention is capable of receiving a variety of mechanical expressions one of which is shown on the accompanying drawings, but it is to be expressly understood that the drawings are for purposes of illustration only and are not to be construed as a definition of the limits of the invention, reference being had to the appended claims for that purpose.

Referring in detail to said drawings wherein the same reference characters are employed to designate corresponding parts in the several figures:—

Fig. 1 is a side elevation of an engine embodying the present invention.

Fig. 2 is a transverse section on the line 2—2 of Fig. 1.

Fig. 3 is an enlarged perspective of the rotatable shaft and its surrounding sleeve which constitute the valve mechanism.

Fig. 4 is an enlarged section on the line 4—4 of Fig. 2, and

Fig. 5 is an enlarged section on the line 5—5 of Fig. 2.

In the form shown, a boiler 10 is provided of any suitable size, shape and material, the same preferably being formed as a cylindrical vessel of sheet or drawn metal having ends suitably soldered or brazed thereto. A suitable filling opening is provided by means of a nipple 11 which may be closed by a threaded plug 12 or said nipple may be threaded to receive a whistle, relief valve or other adjunct.

This boiler is suitably mounted so that heat may be applied thereto to boil the water. In the form shown, the boiler 10 is mounted by means of a pair of straps 13 on a generally rectangular housing 14, which may be desirably formed of sheets of metal connected by suitable tabs 15. Within the housing 14 is a shelf 16 for supporting the heating element, such as a small alcohol lamp 17, and to enable the lamp to be conveniently inserted and withdrawn, the shelf 16 and one end wall of the housing may be formed as a drawer and a suitable handle 18 provided to facilitate the manipulation of this drawer. When such a construction is employed, the side walls of the housing 14 may be bent inwardly adjacent their bottoms as shown at 19 so as to provide guides for the drawer while leaving legs 20 at the corners of the housing. Suitable apertures for the inflow and outflow of air may be provided, a row of holes 14′ being illustrated in each of the side walls just below the boiler so that the hot air and products of combustion will strike the bottom of the boiler 10 before escaping from the housing 14. It is to be expressly understood, however, that any other suitable construction of housing or support for the boiler may be employed, and other arrangements for supporting or permitting the insertion and withdrawal of the burner or lamp may be used, and other sources of heat, as an electric heating element, may be provided, if desired.

Mounted in any suitable way, as on the boiler 10, is an expansible and collapsible vessel 21 of any suitable form but preferably having a deeply-corrugated flexible tubular wall of resilient metal, said vessel being closed at its opposite ends by end walls 22 and 23. In the form shown, said vessel 21 is mounted by means of a bracket 24 having an arcuate portion suitably attached, as by soldering or brazing, to the cylindrical wall of the boiler 10. At the opposite ends of said arcuate portion the bracket is provided with up-standing arms 25 and 26 which carry a sleeve 27 suitably attached thereto, as by brazing or soldering. The stationary end wall 22 of the vessel 21 is mounted on this sleeve 27 and suitably secured thereto, as by brazing or soldering. The upstanding arm 26 of said bracket is extended above the sleeve 27, as shown at 28, and provided with a pair of inwardly directed lugs 29 in which a lever 30 is pivotally mounted, as by a cotter pin 31. The movable end wall 23 of vessel 21 is provided with a suitable thrust element 32 which, in the form shown, is a wedge-shaped post suitably formed, as of sheet metal bent at a sharp angle and secured to the movable end wall 23 at its base. The narrow or knife-edge end 33 of said thrust element is designed to contact the under side of the lever 30 and provide a one-way driving connection therewith.

Mounted within the sleeve 27 is a tubular shaft 34 which is held in position in said sleeve by collars 35 and 36 suitably secured on the projecting ends of said shaft and abutting the corresponding ends of the sleeve 27. The end of said shaft underlying the free end of the lever 30 is provided in any suitable way with a crank arm 37, shown as in the form of a bent rod which projects through the collar 35 and shaft 34 at one end and, making a right angle turn, is provided with a pair of collars 38 suitably retained on its opposite end as by a cotter pin 39. The crank thus formed is connected to the free end of the lever 30 by a link 40 which may take the form of a rod or stout wire bent around the crank 37 at its lower end and hooked through a hole in the lever 30 at its opposite end.

The tubular shaft 34 is designed to constitute a valve mechanism for admitting steam from the boiler 10 to the vessel 21 and exhausting the steam therefrom. To this end a pipe 41 leads from the top or steam space in the boiler 10 and at its opposite end communicates with a port 42 in the tubular wall of the sleeve 27. Said sleeve is also provided with a pair of ports 43 and 44 which communicate through ports 45 and 46, in the stationary end wall 22 of the vessel 21, with the interior of said vessel. The bore of the tubular shaft 34 is provided with an interior partition 47 in a plane intermediate the planes of the ports 43, 45 and 44, 46, this partition conveniently taking the form of a plug forced into the bore of the shaft. A second similar plug 48 closes the bore of the shaft adjacent the crank end thereof. The bore of the shaft intermediate the plugs 47 and 48 constitutes a steam chamber 49 which communicates with the pipe 41 and the admission ports 43, 45 when angularly disposed ports 50, 51 in the wall of said shaft respectively register with the ports 42 and 43. The space in the bore of said tubular shaft on the opposite side of said partition 47 constitutes an exhaust pipe 52 which is open to the air at its outer end and communicates at its inner end with the interior of the vessel 21 when a port 53 in the wall of the shaft registers with the exhaust ports 44, 46. The ports 51 and 53 are disposed on approximately opposite sides of the tubular shaft 34 so that they are alternately brought into register with the admission ports 43, 45 and the exhaust ports 44, 46 at the end of each half revolution of the shaft 34.

The shaft 34 is preferably provided with a fly-wheel 54 which may be conveniently mounted on the sleeve 36 heretofore referred to, and said fly-wheel 54 may be made in the form of a pulley, or it may be provided with a pulley extension 55, for the purpose of driving any desired mechanism.

In operation, the boiler 10 is partly filled with water and the alcohol lamp 17 or other suitable heating element is disposed beneath the same on the shelf 16. When the water begins to boil the engine may be started by giving an initial rotary impulse to the fly-wheel 54 or the shaft 34, whereupon the engine will continue to run as long as steam is made in the boiler 10. When the shaft 34 rotates into the position shown in Fig. 4, the ports 50 and 51 in said shaft are in register respectively with the port 42 and the ports 43, 45. Steam may thereupon flow from the steam space of the boiler 10 through the pipe 41, the ports 42 and 50, the steam space 49, and the ports 51 and 43, 45 into the interior of the vessel 21, where the application of pressure to the movable end wall 23 causes said vessel to expand and the thrust element 32 to move the lever 30 from its lower to its upper position. This movement of the lever 30 is transmitted through the link 40 to the crank 37 to rotate the shaft. When the shaft is rotated through approximately 180°, closing the ports 42 and 43, 45, the exhaust port 53 is brought into register with the exhaust ports 44, 46 and the steam in the vessel 21 may escape through the exhaust pipe 52 to the air. This reduction of pressure in the vessel 21 permits the resilience inherent in the corrugated wall to return the vessel to unexpanded condition, and the lever 30 may follow the thrust element 32 to its lower position, the momentum of the shaft and fly-wheel being sufficient to carry the shaft through its second 180° of revolution until the admission ports are again brought into register to permit a fresh flow of steam into the vessel 21 and produce a new expansion of said vessel and a new thrust on the lever 30. Hence the shaft 34 is rotated by the oscillations of the lever 30 which in turn are caused by the expansion and contraction of the vessel 21, while the shaft 34 by its rotation constitutes the valve mechanism for admitting and exhausting fluid to and from the interior of said vessel.

It has been found that the one-way driving connection between the movable end wall 23 of the vessel 21 and the lever 30 greatly facilitates the starting of the engine as the first expansions of the vessel 21 do not appear to be complete expansions, probably because of condensation of steam in the vessel 21 until its walls become sufficiently heated. Hence the thrust element 32 is not moved its full stroke during its first few operations, but the impulse given to the lever 30, aided by the inertia of the fly-wheel, is sufficient to rotate the shaft 34 even though the lever 30 is thrown upwardly out of contact with the thrust element 32. Hence the steam is admitted to the interior of the vessel 21 at regularly recurring intervals to raise the temperature of the vessel so that condensation of steam therein does not prevent the thrust element 32 from making its full stroke, whereas if the lever 30 were positively connected to the thrust element 32 so that during the initial strokes the lever 30 would have to complete its stroke against the resistance to expansion of the vessel 21, the engine could be started only with considerable difficulty, if at all.

It will therefore be perceived that a simple, compact and inexpensive engine has been produced which is composed of a minimum number of rugged, easily manufactured parts. The boiler, housing, brackets, lever 30 and thrust element 32 can be simply and inexpensively produced from sheet metal, the sleeve and shaft from short lengths of pipe, the collars 35 and 36 from sections of the same pipe as sleeve 27, the crank and link from short pieces of round stock, and the expansible and collapsible vessel from short lengths of corrugated tubular wall closed by stamped metal heads. Hence all of the component elements of the engine are of simple, rugged construction and may be inexpensively manufactured and easily assembled, the assembling operations being chiefly brazing operations.

Moreover, owing to the simplicity and rugged character of the component elements, there is little danger of the engine getting out of order even though it be handled roughly as a toy. Nor is there danger of the device being rendered inoperative by an early rupture of the expansible and collapsible vessel because all of the flexure takes place in the deep corrugations of the tubular wall which, being made of resilient metal, is capable of standing many millions of flexures without injury thereto. Hence an engine constructed in conformity with this invention may be inexpensively manufactured in large quantities for sale at a moderate price whereby it is available as a toy and capable of use through a long period of time without danger of being injured or broken.

While the preferred embodiment of the invention has been described as employing steam as the motive fluid, it is to be understood that the invention is not restricted thereto in its broader aspects, as hot air, compressed air, etc., may be used to drive the engine if desired. Thus the boiler 10 may be suitably constructed to constitute a container wherein air is heated and the engine operated by the admission of hot air from said container to the vessel in the manner heretofore described. Additionally, while the embodiment of the invention illustrated on the drawings has been described with considerable particularity it is to be understood that the invention is not restricted thereto, as the same is capable of receiving a variety of mechanical expressions, some of which will now readily suggest themselves to those skilled in the art, while changes may be made in the details of construction, arrangement and proportion of parts, and certain features used without other features, without departing from the spirit of this invention. Reference is therefore to be had to the claims hereto appended for a definition of the limits of the invention.

What I claim is:—

1. A toy steam engine including a container for a motive fluid, an expansible and collapsible vessel mounted on said container and adapted to communicate therewith, said vessel having a movable end wall, a rotatable shaft between said container and vessel, means cooperating with said movable end wall for rotating said shaft, said shaft being provided with admission and exhaust passages and means interposed between said vessel and said container and cooperating with said shaft whereby said shaft constitutes an admission and exhaust valve for said vessel.

2. An engine including a corrugated expansible and collapsible vessel having a stationary end wall and a movable end wall, a sleeve associated with said stationary end wall, a tubular shaft rotatably mounted in said sleeve, and means cooperating with said movable end wall for rotating said shaft, said stationary end wall having admission and exhaust ports controlled by the rotation of said tubular shaft.

3. An engine including a vessel having a flexible corrugated tubular wall and movable and stationary end walls, a sleeve associated with the stationary end wall and provided with admission and exhaust ports communicating with the interior of said vessel, a tubular shaft rotatably mounted in said sleeve and having admission and exhaust ports adapted to register with said first-named admission and exhaust ports, and means cooperating with said movable end wall for rotating said shaft.

4. An engine including a vessel having a flexible corrugated tubular wall of resilient metal and stationary and movable end walls, a rotatable shaft provided with ports and associated with said stationary end wall, means operated by but unconnected with said movable end wall for rotating said shaft, and means cooperating with said shaft whereby the rotation of said ports effects admission and exhaustion of fluid to and from said vessel.

5. An engine including a corrugated expansible and collapsible vessel having a movable end wall, a thrust element mounted on said movable end wall, a lever pivoted on a stationary bracket and engaged by but unconnected with said thrust element to constitute a one-way driving connection, a shaft operatively connected to said lever, and valve mechanism for controlling the admission and exhaust of a fluid to and from said vessel.

6. An engine including a corrugated expansible and collapsible vessel having a movable end wall and a ported stationary end wall, a container for a motive fluid on which said vessel is mounted, a sleeve mounted on said stationary end wall and provided with ports registering with the ports in said wall, a shaft rotatably mounted in said sleeve and provided with admission and exhaust ports adapted to register with the ports in said sleeve, and means cooperating with said movable end wall for rotating said shaft.

7. An engine including an expansible and collapsible vessel having movable and stationary end walls, said stationary end wall having admission and exhaust ports, a sleeve on said stationary end wall provided with registering admission and exhaust ports, a tubular shaft having an interior partition rotatably mounted in said sleeve and provided with ports on opposite sides of said partition for alternately registering with said first-named ports, and means cooperating with said movable end wall for rotating said shaft.

8. An engine including an expansible and collapsible vessel having movable and stationary end walls, a sleeve mounted on said stationary end wall and provided with admission and exhaust ports communicating with the interior of said vessel, a pipe communicating with said sleeve, a tubular shaft having an interior partition, said sleeve at one side of said partition having ports for completing the communication between said pipe and said admission port and at the opposite side of said partition having a port for registering with said exhaust port whereby said shaft constitutes an exhaust pipe, and means cooperating with said movable end wall for rotating said shaft.

9. A toy steam engine including an expansible and collapsible vessel having a stationary end wall mounted on a container for a motive fluid and a movable end wall, a rotatable tubular shaft interposed between said stationary end wall and said container and adapted to alternately open communication between said container and said vessel and to exhaust said vessel through said shaft to the air, and means cooperating with said movable end wall for rotating said tubular shaft.

10. An engine including an expansible and collapsible vessel having a corrugated flexible tubular wall of resilient metal and movable and stationary end walls, a rotatable shaft cooperating with ports in said stationary end wall to admit and exhaust fluid to and from said vessel, a lever operatively connected to a crank on said shaft, and means on said movable end wall of said vessel engaging but unconnected with said lever for operating the same.

11. A toy steam engine including a container for a motive fluid, a bracket mounted thereon and including a sleeve, an expansible and collapsible vessel mounted on said sleeve and having ports communicating with the interior thereof, a shaft rotatably mounted in said sleeve, means whereby said shaft is rotated by the expansion and contraction of said vessel, and registering ports in said sleeve and shaft whereby said shaft during its rotation alternately admits fluid from said container to said vessel and exhausts fluid from said vessel to the air.

12. A toy steam engine including a container for a motive fluid, a bracket mounted on said container and including a sleeve, an expansible and collapsible vessel having a stationary end wall mounted on said sleeve and a movable end wall, a shaft rotatably mounted in said sleeve, said sleeve and shaft having registering ports for alternately admitting fluid from said container to said vessel and exhausting said fluid to the air, a lever pivoted on said bracket and operatively connected to said shaft, and a thrust connection between the movable wall of said vessel and said lever.

In testimony whereof I have signed this specification.

JEAN V. GIESLER.